(12) United States Patent
Tange et al.

(10) Patent No.: US 10,233,092 B2
(45) Date of Patent: Mar. 19, 2019

(54) BALLAST WATER TREATMENT DEVICE

(71) Applicant: MIURA CO., LTD., Matsuyama-shi, Ehime-ken (JP)

(72) Inventors: Tomoaki Tange, Matsuyama (JP); Yasutomo Zenman, Matsuyama (JP)

(73) Assignee: MIURA CO., LTD., Matsuyama-shi (JP)

( * ) Notice: Subject to any disclaimer, the term of this patent is extended or adjusted under 35 U.S.C. 154(b) by 164 days.

(21) Appl. No.: 15/385,275

(22) Filed: Dec. 20, 2016

(65) Prior Publication Data

US 2017/0349450 A1 Dec. 7, 2017

(30) Foreign Application Priority Data

Jun. 7, 2016 (JP) ................. 2016-113941

(51) Int. Cl.
| | |
|---|---|
| *C02F 1/00* | (2006.01) |
| *C02F 1/32* | (2006.01) |
| *C02F 103/00* | (2006.01) |
| *C02F 1/467* | (2006.01) |

(52) U.S. Cl.
CPC .............. C02F 1/008 (2013.01); C02F 1/004 (2013.01); C02F 1/32 (2013.01); C02F 1/325 (2013.01); C02F 1/4674 (2013.01); C02F 2103/008 (2013.01); C02F 2209/005 (2013.01); C02F 2209/03 (2013.01); C02F 2209/40 (2013.01); C02F 2301/043 (2013.01); C02F 2303/04 (2013.01); C02F 2303/16 (2013.01)

(58) Field of Classification Search
CPC ...... C02F 1/008; C02F 1/004; C02F 2209/03; C02F 1/32; C02F 1/4674; C02F 2209/40; C02F 2303/16; C02F 2303/04; C02F 2209/005; C02F 2103/008; C02F 1/325; C02F 2301/043
USPC ......... 210/409, 87, 103, 130, 138, 241, 258, 210/259, 192
See application file for complete search history.

(56) References Cited

U.S. PATENT DOCUMENTS

| | | | |
|---|---|---|---|
| 2008/0190826 A1* | 8/2008 | Miner ................... | C02F 1/004 210/98 |
| 2010/0176071 A1* | 7/2010 | Mimura ................ | B01D 24/10 210/798 |

FOREIGN PATENT DOCUMENTS

| | | |
|---|---|---|
| EP | 2886438 A1 | 6/2015 |
| JP | 2014-227063 A | 12/2014 |

* cited by examiner

*Primary Examiner* — Madeline Gonzalez
(74) *Attorney, Agent, or Firm* — Kenichiro Yoshida

(57) ABSTRACT

A ballast water treatment device capable of suppressing damage to a filter is provided. The ballast water treatment device is provided with: a filtering device including a filter for filtering ballast water; a plurality of lines for a flow of the ballast water; a ballast pump for pumping the ballast water to flow into the plurality of lines; and a control unit for controlling the ballast pump to cause the ballast water to flow into a desired line. The plurality of lines includes an object line connected to the filtering device, and a discharge line diverging from the object line and connected to an outside of a system. The control unit controls the ballast pump to discharge the ballast water remaining in the object line to the outside of the system via the discharge line, by causing a ballast water flow through the object line and the discharge line.

14 Claims, 10 Drawing Sheets

BALLAST WATER TREATMENT DEVICE

BACKGROUND

1. Technical Field

The present invention relates to a ballast water treatment device.

2. Related Art

A vessel such as a tanker usually stores water called ballast water in a ballast tank disposed on the vessel in order to balance the vessel under way while traveling toward another destination after unloading freight, such as crude petroleum. Ballast water is normally charged at an unloading port and discharged at a loading port. Therefore, if these ports are located at different places, microorganisms such as plankton and bacteria in the ballast water may come to travel all over the world. Thus, ballast water is discharged at a loading port in a sea area different from that of an unloading port, and microorganisms in another sea area are released at the loading port and may destroy the ecosystem in the sea area.

In order to decrease the amount of microorganisms contained in the ballast water, a ballast water treatment device may be used. The ballast water treatment device includes a filter disposed in a casing for filtering ballast water (see JP-A-2014-227063).

SUMMARY

The ballast water treatment device is provided with a plurality of lines (a general term for piping for a flow of fluid, including flow passageways, routes, and conduits) running through various constituent elements of the ballast water treatment device, such as a filtering device including a filter, a pumping unit (pump) for pumping ballast water, and on/off valves for controlling the on/off of flow of ballast water and its flow rate. During an operation for treating ballast water, untreated ballast water (mainly sea water) from outside the system is introduced into the filtering device via a predetermined line. The ballast water that has been filtered is thereafter preferably subjected to a microorganisms sterilization treatment, and then stored in the ballast tank, or discharged again outside the system.

However, after the end of operation, it often happens that the ballast water remains in some parts of the lines. The ballast water remaining in parts of the lines may come into contact with the filter and thereby cause degradation of the filter. In the following, the contact between the residual ballast water and the filter will be described on a line byline basis.

First, the line through which the ballast water flows from outside the system into the primary side of the filter in the filtering device will be described. If the ballast water remains here, the ballast water may decompose, resulting in a proliferation of bacteria or formation of biofilm in the line. The decomposed ballast water may be introduced into the primary side of the filter during the next round of operation. As a result, the differential pressure between the primary side and the secondary side of the filter may sharply increase, potentially causing damage to the filter.

Next, the line through which the ballast water flows from the secondary side of the filter to the rinsing water spray nozzles will be described. This line is a line which is used for a filter rinsing method called "underwater rinsing" in which, in a liquid-tight state in which the casing is filled with the ballast water (on the primary side and the secondary side of the filter), the ballast water that has been filtered on the secondary side of the filter is sprayed from the secondary side of the filter toward the primary side. In particular, during the filtering process, the differential pressure between the primary side and the secondary side of the filter is monitored. If a predetermined differential pressure or above is detected, it is determined that a large amount of foreign matter has become attached to or deposited on the filter, and underwater rinsing is controlled to be automatically performed. However, if the ballast water remains in the line after the end of operation, the ballast water may decompose, causing a proliferation of bacteria or formation of biofilm in the line, for example. In this case, if underwater rinsing is implemented during the next round of operation, the decomposed ballast water is sprayed against the filter as rinsing water, potentially damaging the filter.

The present invention has been made in view of the above circumstance, and an object of the present invention is to provide a ballast water treatment device with which damage to a filter can be suppressed.

According to the present invention, there is provided a ballast water treatment device including a filtering device including a filter for filtering ballast water; a plurality of lines having valves for flowing the ballast water to and from the filtering device; and a control unit for controlling a ballast pump and the valves so as to cause the ballast water to flow through the plurality of the lines. The plurality of lines includes any combination of at least one of the lines including at least one object line connected to the filtering device. The control unit is configured to control the ballast pump and the valves so as to cause the ballast water that has remained in the object line to be discharged to an outside of a system.

In the following, various embodiments of the present invention will be described by way of example. The embodiments may be combined with one another.

Preferably, the plurality of lines may include a bypass line into which the ballast water flows from outside the system and from which the ballast water is discharged to the outside of the system. The object line may include a first line with one end connected to the bypass line and another end connected to a primary side of the filter. The discharge line may include a second line configured to discharge the ballast water that has remained in the first line to be discharged to the outside of the system.

Preferably, the filtering device may further include a rinsing water jet nozzle for jetting rinsing water for rinsing the filter. The object line may include a third line with one end connected to a secondary side of the filter and another end connected to the rinsing water jet nozzle. The discharge line may include a fourth line configured to discharge the ballast water that has remained in the third line to be discharged to the outside of the system.

Preferably, the control unit may perform control of the ballast pump immediately before or after starting the operation of a ballast water treatment.

According to the ballast water treatment device of the present invention, by causing the ballast water to flow through the object line and the discharge line, the ballast water that has remained in the object line is discharged to the outside of the system via the discharge line. In this way, the ballast water that has remained after the end of the previous operation can be prevented from contacting the filter, whereby damage to the filter can be suppressed.

DETAILED DESCRIPTION

A ballast water treatment device according to an embodiment of the present invention will be described with reference to the drawings. Various features of the embodiment may be combined with one another. Each of the features of the embodiment may independently constitute an invention.

1. Overall Configuration

Figure 1:
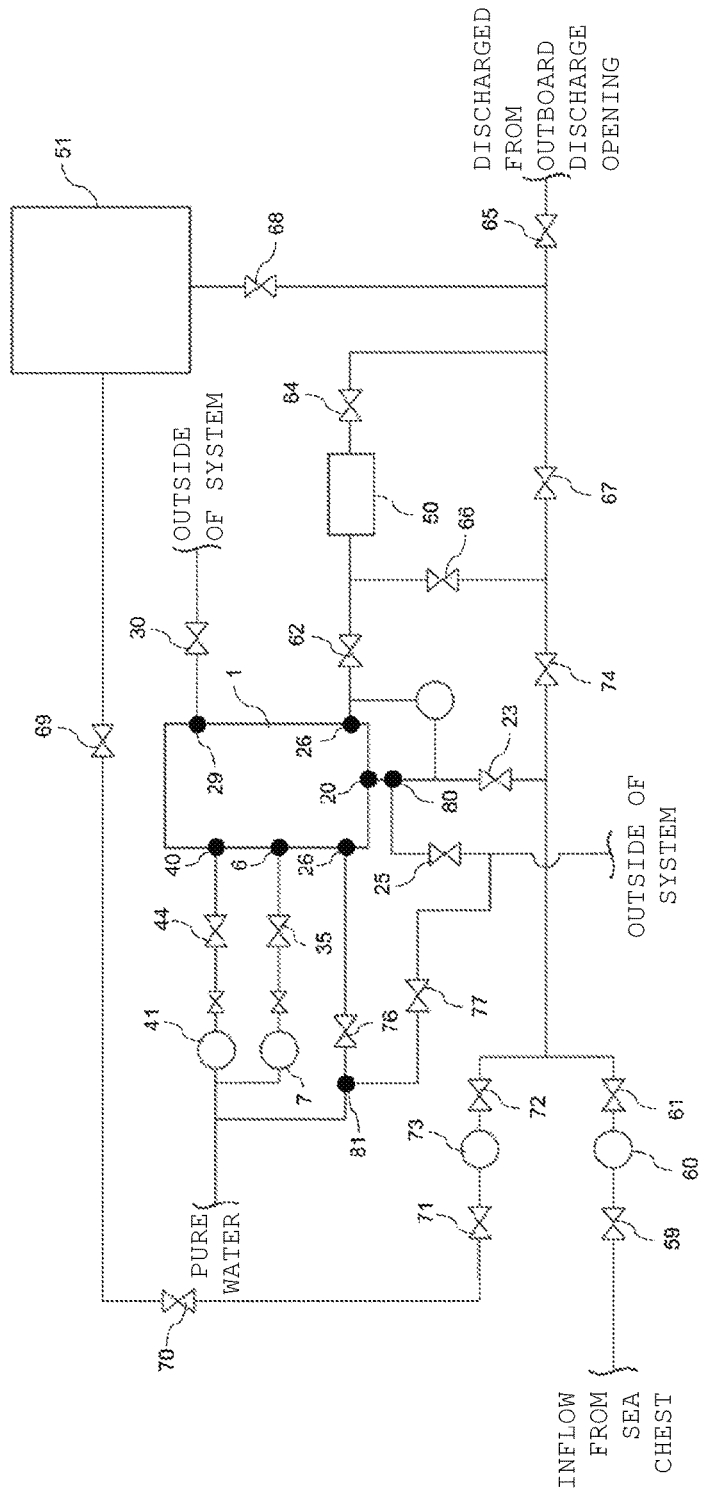
FIG. 1 is a schematic diagram of a ballast water treatment device according to an embodiment of the present invention.

FIG. 1 is a schematic diagram illustrating a configuration of the ballast water treatment device according to the present embodiment. As illustrated in FIG. 1, the ballast water treatment device of the present embodiment is provided with a ballast water filtering device 1 including a filter 2; an ultraviolet reactor 50 for sterilizing microorganisms by ultraviolet irradiation; and a ballast tank 51 for storing ballast water.

The ballast water treatment device according to the present embodiment is also provided with a plurality of lines connected to the respective constituent elements, including, in particular, lines L1 to L6 as illustrated in FIGS. 5A, 5B, 7A, 7B, 9 and 10 and associated with flushing to be described below. The "line" is a general term referring to piping for a flow of fluid, including a flow passageway, a route, a conduit and the like.

In the present specification, the "ballast water" refers to all water that is taken into the vessel, regardless of whether before being introduced (entered) into the ballast tank 51 or after being discharged (drained) out of the ballast tank 51; whether before being introduced (entered) into the filter 2 or after being discharged (drained) out of the filter 2; and even whether before being introduced (entered) into the ultraviolet reactor 50 or after being discharged (drained) out of the ultraviolet reactor 50. Accordingly, the ballast water may include sea water, fresh water, and brackish water.

<Ballast Water Filtering Device 1>

Figure 2:
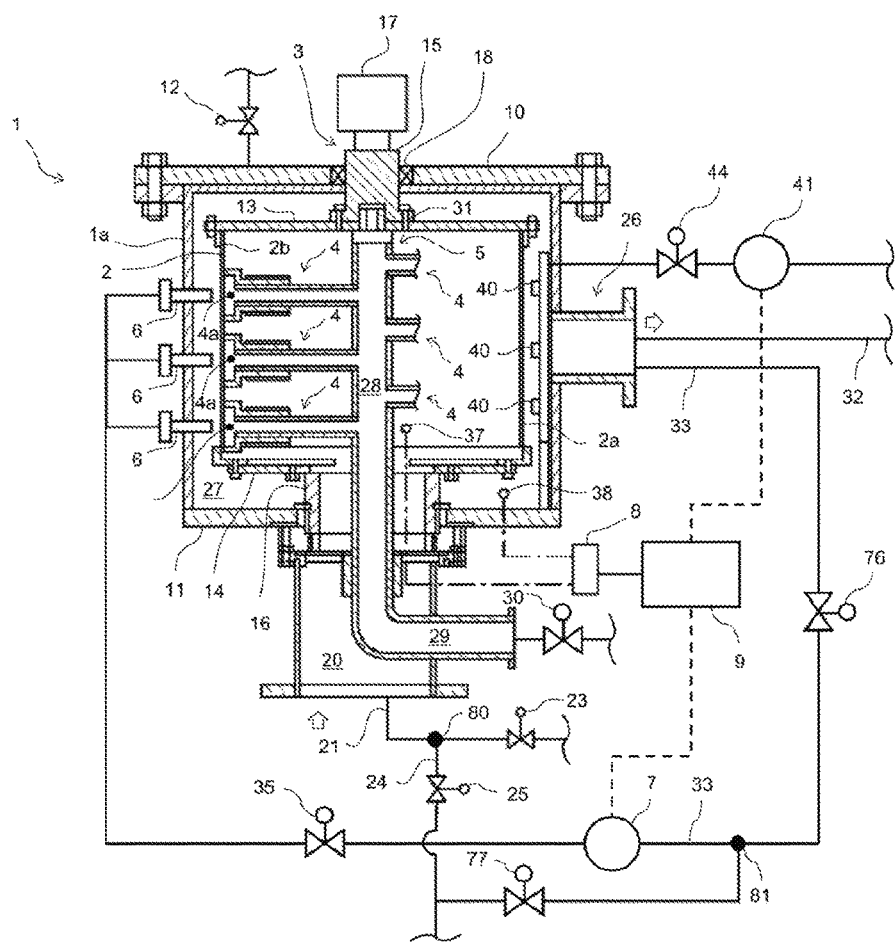
FIG. 2 is a detailed diagram of the ballast water filtering device 1.

FIG. 2 is a schematic diagram illustrating the details of the ballast water filtering device 1. The ballast water filtering device 1 is provided with a cylindrical casing 1a; a cylindrical filter 2 for filtering and draining to the outside the ballast water before the filtering which is contained in the casing 1a and which has entered the cylindrical filter for filtering, such as sea water; and a filter rotation unit 3 for rotating the filter 2 about an shaft center thereof.

The casing 1a is formed in a cylindrical shape and includes an upper opening portion which is sealed with a lid 10, and a lower opening portion which is sealed with a bottom portion 11. The lid 10 is fitted with an air vent valve 12 for venting air from the casing 1a. The cylindrical filter 2 disposed in the casing 1a has an upper opening portion which is sealed with an upper closure portion 13, and a lower opening portion which is closed by a lower closure portion 14 and a lower rotating shaft member 16, as will be described later. In this configuration, the inside of the filter 2 is separated from the side of an outflow space 27 which is formed between the casing 1a and the filter 2 to drain the ballast water W2 that has passed through the filter 2.

The filter 2 may preferably include a filtering body made of wire netting and the like formed in a cylindrical shape and sandwiched between support members comprising two metal thin plates having a number of holes and formed in cylindrical shape. Alternatively, the filtering body may be disposed on the outer peripheral surface of a support member comprising a metal thin plate having a number of holes and formed in cylindrical shape.

The filter rotation unit 3 for rotating the filter 2 includes an upper rotating shaft member 15, a lower rotating shaft member 16, and a motor 17. The upper rotating shaft member 15 and the lower rotating shaft member 16 are respectively disposed on the upper closure portion 13 and the lower closure portion 14 of the filter 2 at the shaft center position thereof, and protrude in the shaft center direction of the filter 2. The motor 17 rotates the upper rotating shaft member 15.

The upper rotating shaft member 15 penetrates through the lid 10 of the casing 1a, and is supported by the lid 10 via a sealed bearing member 18, in a freely rotatable and liquid-tight manner. The lower rotating shaft member 16 penetrates through the bottom portion 11 of the casing 1a, and is supported by the bottom portion 11 via a sealed bearing member 19 in a freely rotatable and liquid-tight manner.

The lower rotating shaft member 16 is a tubular member that communicates with the inside of the filter 2. The lower rotating shaft member 16 protrudes from the bottom portion 11 of the casing 1a outside the casing 1a. To the lower rotating shaft member 16, an introduction opening 20 is connected for introducing into the filter 2 untreated ballast water W1 to be filtered. To the introduction opening 20, an introduction path 21 is connected. The introduction path 21 is fitted with an on/off valve 23. To the introduction path 21 on the downstream side of the on/off valve 23, a drainage path 24 is connected. The drainage path 24 is fitted with an on/off valve 25.

The casing 1a has an outflow opening 26 in the side for draining ballast water W2 that has passed through the filter 2 and been filtered. The ballast water W1 that has flowed through the introduction path 21 and introduced via the introduction opening 20 passes through the lower rotating shaft member 16 and enters the filter 2. The ballast water W1 then passes through and is filtered by the filter 2, enters the outflow space 27 formed between the casing 1a and the filter 2, and flows out via the outflow opening 26 as the ballast water W2. The ballast water W2 that has been filtered and drained out of the outflow opening 26 passes through an outflow water path 32 and flows into other constituent elements, such as the ultraviolet reactor 50 or the ballast tank 51.

In the ballast water filtering device 1, the discharge unit 5 includes a collecting pipe 28 which is connected to a plurality of suction nozzles 4 and which collects the ballast water suctioned by the suction nozzles 4; a discharge pipe 29 which is connected to the collecting pipe 28 and which discharges the collected ballast water to the outside; and an on/off valve 30 with which the discharge pipe 29 is provided. The collecting pipe 28 is disposed at the shaft center of the filter 2, has a closed upper end portion, and an open lower end portion. The upper end portion is freely rotatably fitted in a hole provided at the center of the upper closure portion 13 of the filter 2 via a bearing member 31. The lower end portion of the collecting pipe 28 passes through the lower rotating shaft member 16 of the lower closure portion 14 of the filter 2 so as not to interfere with the rotation of the filter 2, and fixedly supported in the introduction opening 20 of the casing 1a. To the lower end portion of the collecting pipe 28, a discharge pipe 29 for discharging the suctioned ballast water to the outside is connected. The discharge pipe 29 is provided with the on/off valve 30, which is normally open during filtering operation.

Preferably, the suction nozzles 4 connected to the collecting pipe 28 and opened toward the inner peripheral surface of the filter 2 are configured to be able to suction from the entire area in the axial direction of the filter 2; the configuration of the suction nozzles 4, however, is not particularly limited. For example, a plurality of suction nozzles 4 may be disposed at varying angles linearly in the axial direction and/or in a circumferential direction of the filter 2. The suction nozzles 4 disposed at varying angles in the circumferential direction may be disposed at the same height or at different heights. According to the present embodiment, a plurality of suction nozzles 4 is used, which is disposed linearly in the axial direction of the filter 2 and connected to the collecting pipe 28. In order to eliminate the non-suctioned portions between the vertically disposed suction nozzles 4, according to the present embodiment, the suction nozzles 4 are disposed in two columns in the axial direction of the filter 2. Between the suction nozzles 4 of one column, the suction nozzles 4 of the other column are positioned. Specifically, the suction nozzles 4 are disposed on the right and left sides of the collecting pipe 28 alternately in the height direction.

A differential pressure detection unit 8 detects a differential pressure between the primary side and the secondary side of the filter 2. Specifically, the differential pressure detection unit 8 is configured to sense the pressures on the primary side and the secondary side of the filter 2, using pressure sensors 37 and 38 disposed in the filter 2 and the outflow space 27, and detect the differential pressure between the primary side and the secondary side of the filter 2. The differential pressure between the primary side and the secondary side of the filter 2 enables a determination of the degree of contamination of the filter 2. A large differential pressure indicates a large amount of deposited foreign matter on the filter 2. A small differential pressure indicates that the filter 2 is in a state close to its initial state.

The "underwater rinsing" is a rinsing method for the filter 2 which is performed in a liquid-tight state with the casing 1a (primary side and secondary side of the filter 2) being filled with ballast water. Because the underwater rinsing is performed in liquid-tight state, the underwater rinsing is mainly performed during the ballast water treatment operation.

During underwater rinsing, rinsing water jet nozzles 6 jet rinsing water toward the filter 2. The rinsing water jet nozzles 6 are disposed on the side of the casing 1a, and opened into the casing 1a. Preferably, the rinsing water jet nozzles 6 are configured to be able to jet the rinsing water onto the entire area in the axial direction of the filter 2; however, the configuration of the rinsing water jet nozzles 6 is not particularly limited. For example, a plurality of rinsing water jet nozzles 6 may be disposed linearly in the axial direction and/or in a circumferential direction of the filter 2 at varying angles. The rinsing water jet nozzles 6 disposed in the circumferential direction at varying angles may be disposed at the same height or at different heights.

According to the present embodiment, the rinsing water jet nozzles 6 are positioned on the same circumference as the plurality of suction nozzles 4, and disposed so as to be positioned in front of the suction nozzles 4 in a direction opposing the rotation direction of the filter 2. However, the rinsing water jet nozzles 6 may be disposed at respective positions opposing the suction nozzles 4, or disposed so as to be positioned behind the suction nozzles 4 in a direction opposing the rotation direction of the filter 2. A rinsing water supply path 33 is fitted with a rinsing water supply unit 7 which is a pump for pumping the ballast water W2 filtered by the filter 2 to the rinsing water jet nozzles 6 as rinsing water, and an on/off valve 35 on the downstream side of the rinsing water supply unit 7.

For the suction nozzles 4 connected to the collecting pipe 28, a plurality of suction nozzles 4 is used. The suction nozzles 4 are disposed linearly in the axial direction of the filter 2 and connected to the collecting pipe 28 with the opening portions of the suction nozzles 4 being closely attached to the inner peripheral surface of the filter 2 in a slidable manner. The vertically disposed suction nozzles 4, in order to eliminate the non-suctioned portions between the suction nozzles 4, are disposed alternately in the height direction on the right and left sides of the collecting pipe 28. Accordingly, the entire area of the inner peripheral surface of the filter 2 can be suctioned by a single rotation of the filter 2. The on/off valve 30 with which the discharge pipe 29 is provided is normally open during operation, and the pressure on the secondary side of the on/off valve 30 is released to the atmospheric pressure. Accordingly, the pressure inside the collecting pipe 28 is lower than the pressure on the secondary side of the filter 2, so that the ballast water (treated water) on the secondary side of the filter 2 flows into the collecting pipe 28 as contaminated rinsing water, and is discharged to the outside via the discharge pipe 29.

In addition, the control unit 9, when the differential pressure detected by the differential pressure detection unit 8 has reached a predetermined differential pressure P1, controls the rinsing water jet nozzles 6 to jet the rinsing water. The predetermined pressure herein is set as a differential pressure at which it is determined that the amount of deposited foreign matter on the filter 2 cannot be entirely removed by the suctioning with the suction nozzles 4.

For the rinsing water jet nozzles 6 that jet the rinsing water toward the filter 2, a plurality of rinsing water jet nozzles 6 is used and disposed so as to be able to jet the ballast water W2 onto the entire area in the axial direction of the filter 2 as rinsing water. The rinsing water jet nozzles 6 are positioned on the same circumference as the plurality of suction nozzles 4 and disposed so as to be positioned in front of the suction nozzles 4 in a direction opposing the rotation direction of the filter 2. Accordingly, the ballast water W2 is jetted onto the entire area of the outer peripheral surface of the filter 2 by a single rotation of the filter 2. Thus, the foreign matter deposited on the primary side of the filter 2 can be efficiently peeled, and the suctioning by the suction nozzles 4 is performed immediately after the peeling. As a result, the foreign matter peeled from the filter 2 using the ballast water W2 jetted from the rinsing water jet nozzles 6 can be effectively suctioned by the suction nozzles 4. Control may be implemented to adjust the jet pressure of the rinsing water in accordance with the differential pressure.

Spatial rinsing is a rinsing method for the filter 2 performed in a non-liquid-tight state in which the ballast water has been removed from within the casing 1a. Because the spatial rinsing is performed in the non-liquid-tight state and provides a highly accurate rinsing effect compared with underwater rinsing, the spatial rinsing is mainly used after the end of ballast water treatment.

For the spatial rinsing, high pressure fluid jet nozzles 40 which are opened toward the outer peripheral surface of the filter 2 to jet high pressure fluid toward the filter 2 are disposed on the secondary side of the filter 2. There is also provided a high pressure fluid supply unit 41 for supplying the high pressure fluid to the high pressure fluid jet nozzles 40. Preferably, the high pressure fluid jet nozzles 40 are configured to be able to jet onto the entire area in the axial direction of the filter 2; however, the configuration of the high pressure fluid jet nozzles 40 is not particularly limited. For example, a plurality of high pressure fluid jet nozzles 40 may be disposed linearly in the axial direction and/or in the circumferential direction of the filter 2 at varying angles. The high pressure fluid jet nozzles 40 disposed in the circumferential direction at varying angles may be disposed at the same height or at different heights.

More specifically, during the ballast water treatment operation, when the differential pressure detected by the differential pressure detection unit 8 has reached a predetermined differential pressure P2 (which, preferably, is generally set to be higher than P1), the on/off valve 25 on the drainage path 24 is opened and the air vent valve 12 with which the lid 10 is fitted is opened to discharge the water in the casing 1a; clean water is supplied to the high pressure fluid jet nozzles 40 using the high pressure fluid supply unit 41; and the clean water, i.e., rinsing water is jetted out of the high pressure fluid jet nozzles 40 as high pressure fluid onto the outer peripheral surface of the filter 2 for a predetermined time, while the filter 2 is rotated. The spatial rinsing may be performed after the end of operation of the filtering process by stopping the ballast water treatment operation and discharging the ballast water within the casing 1a while the filter 2 is rotated.

While in FIG. 2, the rinsing water jet nozzles 6 and the high pressure fluid jet nozzles 40 are illustrated as opposing each other in the casing 1a, they are illustrated in FIG. 1 and FIG. 3 to FIG. 10 as being disposed on the same side. It should be noted that the latter is for the sake of ease of visibility.

<Ultraviolet Reactor 50>

The ultraviolet reactor 50 performs ultraviolet irradiation on the ballast water W2 obtained by the filtering with the filter 2, for microorganisms sterilization treatment. The ballast water W2 that has been subjected to the sterilization treatment will be referred to as ballast water W3.

<Ballast Tank 51>

The ballast tank 51 is configured to permit the inflow of the ballast water W2 or the ballast water W3, and stores the water. That is, the ballast water W2 filtered with the filter 2 flows into the ballast tank 51 via a predetermined line and is stored. Alternatively, the ballast water W2 filtered with the filter 2 is subjected to microorganisms sterilization treatment by the ultraviolet reactor 50, and the resultant ballast water W3 flows into the ballast tank 51 via a predetermined line and is stored.

2. Ballast Water Treatment Operation

A treatment operation for treating ballast water in the ballast water treatment device will be described.

2.1 Ballast Treatment

Figure 3:
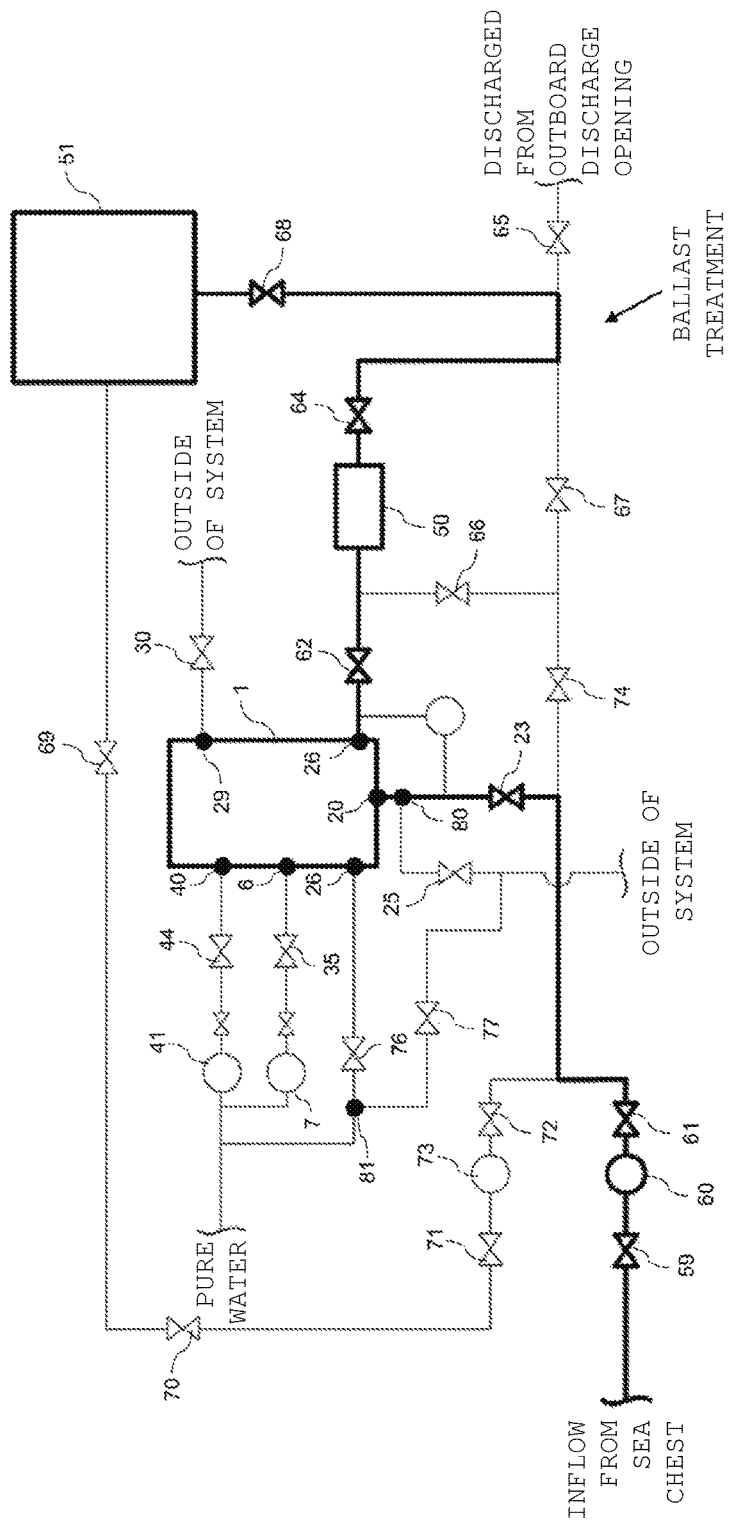
FIG. 3 is a diagram for describing a ballast treatment.

FIG. 3 illustrates a ballast treatment in the ballast water treatment device according to the present embodiment. The ballast water flows through the lines indicated by bold line in FIG. 3, and the ballast water W3 is introduced into the ballast tank 51. In the following, the steps of the treatment will be described.

Start (Step S1-1)

From a sea chest of the vessel, the water outside the system (outside the vessel) (which is mainly sea water) flows into the system (into the vessel) as the ballast water W1. The ballast water W1 passes through the on/off valve 59, the pump 60, the on/off valve 61, and the on/off valve 23 and is introduced into the primary side of the filter 2 in the ballast water filtering device 1. The pump 60 pumps up the ballast water W1 from outside the system (mainly sea water). That is, the pump 60 functions as a pumping unit for pumping (pressurizing by suctioning and discharging to deliver) the ballast water W1 that has flowed into the system. The lines associated with the present step is configured to be able to control the on/off of flow and flow rate of the ballast water W1 using at least one of the on/off valves 23, 59, and 61.

(Step S1-2)

The ballast water W1 that has flowed into the primary side of the filter 2 in step S1-1 is filtered and discharged out of the secondary side of the filter 2 as the ballast water W2. The ballast water W2 then passes through the on/off valve 62 and is introduced to the primary side of the ultraviolet reactor 50. The lines associated with the present step is configured to be able to control the on/off and flow rate of the flow of ballast water W2 using the on/off valve 62.

(Step S1-3)

The ballast water W2 that has flowed into the primary side of the ultraviolet reactor 50 in step S1-2 is subjected to sterilization treatment for microorganisms included therein, and discharged out of the secondary side of the ultraviolet reactor 50 as the ballast water W3. The ballast water W3 then passes through the on/off valves 64 and 68 and is introduced into the ballast tank 51. The lines associated with the present step is configured to be able to control the on/off of the flow of the ballast water W3 and its flow rate using the on/off valves 64 and 68.

End 2.2 De-Ballast Treatment

Figure 4:
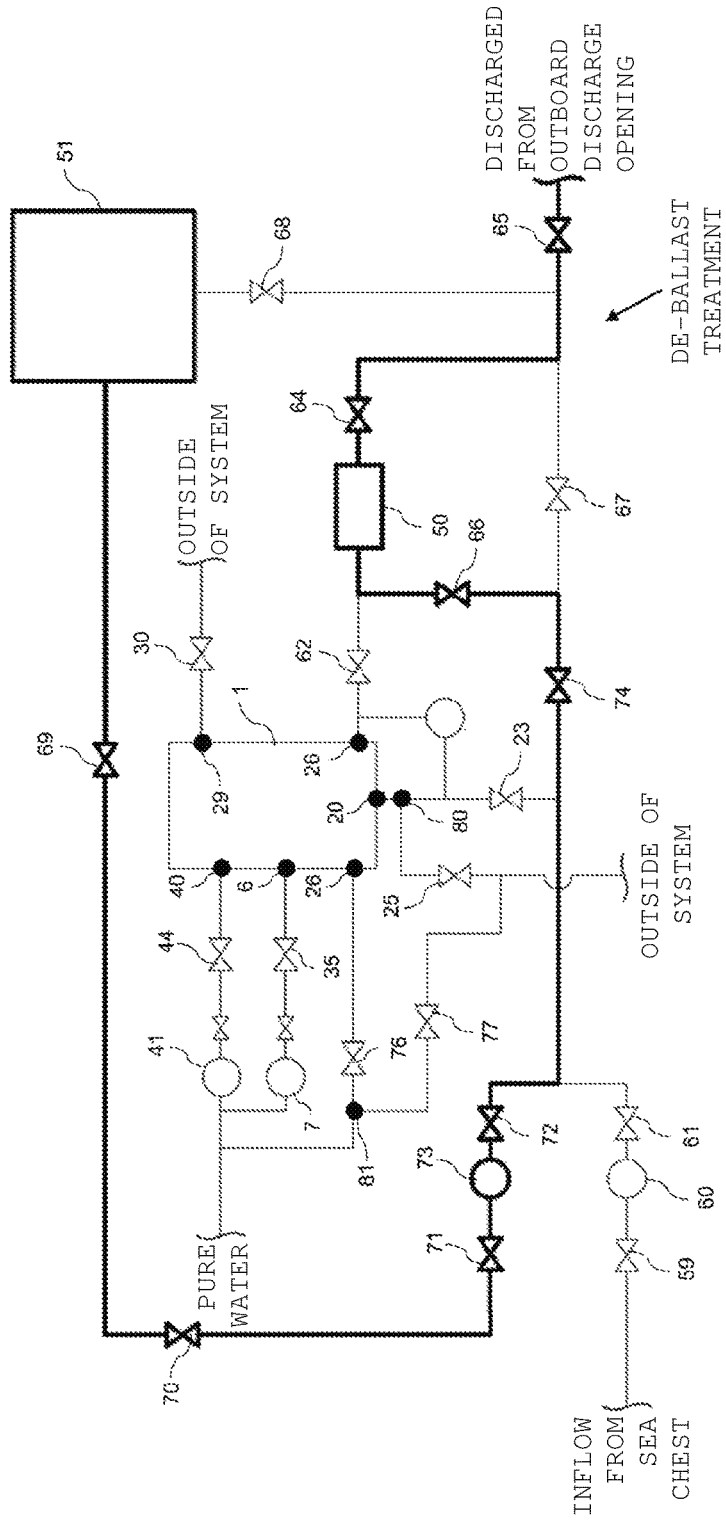
FIG. 4 is a diagram for describing a de-ballast treatment.

FIG. 4 illustrates a de-ballast treatment in the ballast water treatment device according to the present embodiment. The ballast water flows through the line indicated by bold line in FIG. 4. The ballast water W2 stored in the ballast tank 51 becomes the ballast water W3 through the ultraviolet reactor 50 again, and is thereafter discharged to the outside of the system. In the following, the steps of the treatment will be described.

Start (Step S2-1)

The ballast water W3 introduced into the ballast tank 51 in step S1-3, as time elapses, again becomes the ballast water W2 including microorganisms. That is, the ballast water W2 comes to be stored in the ballast tank 51. The stored ballast water W2 passes through an on/off valve 69, an on/off valve 70, an on/off valve 71, a pump 73, an on/off valve 72, an on/off valve 74, and an on/off valve 66 successively, and is again introduced into the primary side of the ultraviolet reactor 50. The pump 73 pumps up the ballast water W2 from the ballast tank 51. Accordingly, the pump 73 functions as a pumping unit for pumping (pressurizing by suctioning and discharging to deliver) the ballast water W2 stored in the ballast tank 51. The lines associated with the present step are configured to be able to control the on/off of flow and flow rate of the ballast water W2 using at least one of the on/off valves 66, 69, 70, 71, 72, and 74.

(Step S2-2)

The ballast water W2 that has flowed into the primary side of the ultraviolet reactor 50 in step S2-1 is subjected to sterilization treatment for microorganisms included therein, and is discharged out of the secondary side of the ultraviolet reactor 50 as the ballast water W3. The ballast water W3 then passes through the on/off valves 64 and 65 and is discharged to the outside of the system from an outboard discharge opening. The lines associated with the present step are configured to be able to control the on/off of flow and flow rate of the ballast water W3 using the on/off valves 64 and 65.

End

In both the ballast treatment and de-ballast treatment, microorganisms sterilization treatment is performed by the ultraviolet reactor 50. In other words, the microorganisms sterilization treatment is doubly performed. Alternatively, the microorganisms sterilization treatment may be implemented in either the ballast treatment or the de-ballast treatment.

3. Flushing

Flushing (which may also be referred to as purging) of the lines in the ballast water treatment device will be described. Flushing herein refers to the discharging of the ballast water that has remained in a desired line ("object line" in the claims) since the previous treatment operation, to the outside of the system. Flushing may be implemented using the force of the untreated ballast water W1 being caused to flow from outside the system. Alternatively, the ballast water may be caused to flow out using other methods, such as using the ballast water stored in the ballast tank 51. Hereafter, the residual ballast water, whether the ballast water W1 or W2, will be referred to as ballast water W4.

3.1 Flushing of Line L1

Figures 5A, 5B:
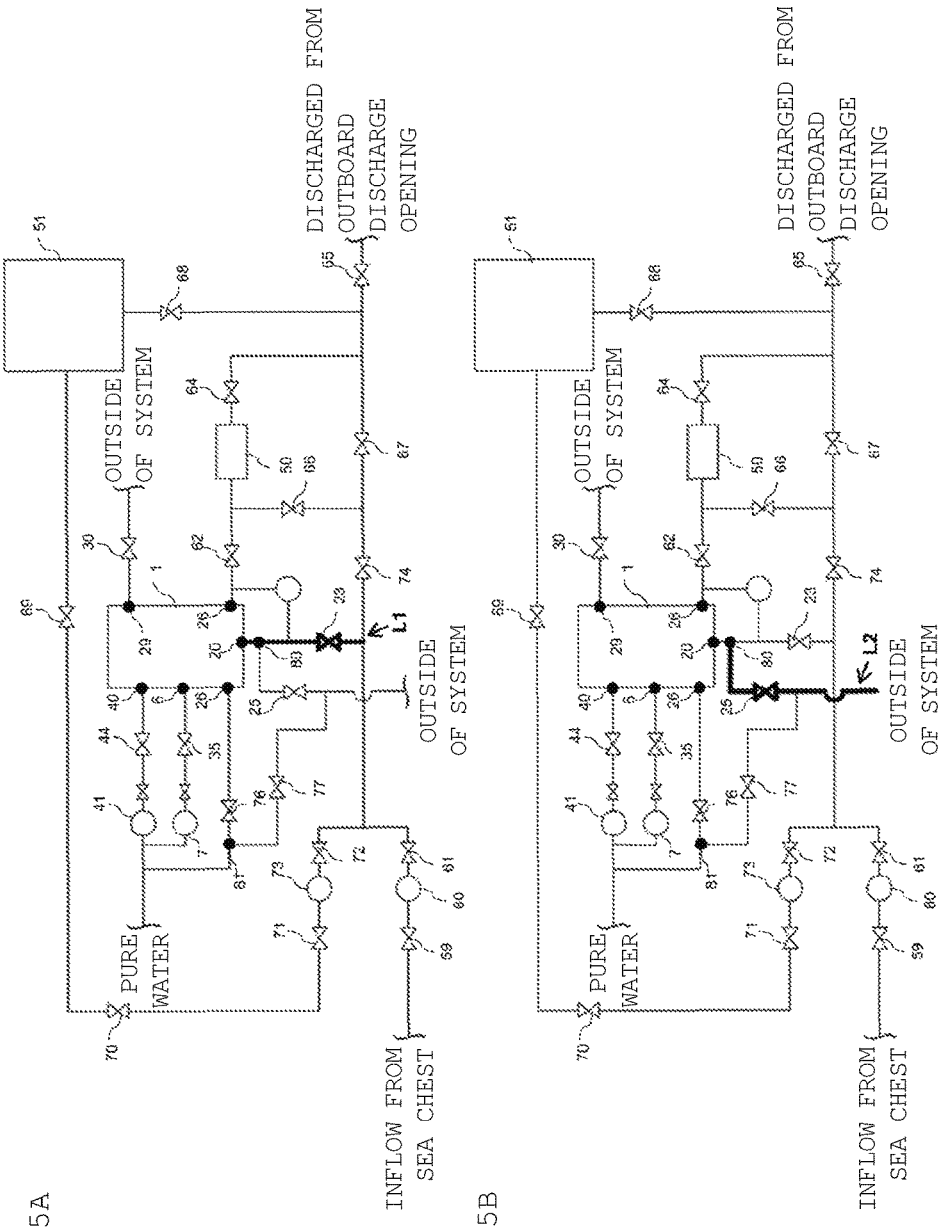
FIG. 5A and FIG. 5B are diagrams respectively for describing lines L1 and L2.

A line L1 indicated by bold line in FIG. 5A (an example of "object line" or "first line" in particular in the claims) is a line which is a part of the ballast water filtering device 1 side of the line through which the ballast water W1 flows from the sea chest into the introduction opening 20, which is on the primary side of the filter 2. The line L1 is provided with the on/off valve 23. That is, the line L1 is a line which is directly connected to the ballast water filtering device 1. In other words, the line L1 is a part of the line for filtering the ballast water W1 into the ballast water W2.

In the line L1 after the end of the treatment operation, the ballast water W1 tends to readily remain as the ballast water W4. The introduction of the ballast water W4 to the primary side of the filter 2 during filtering in the next round of treatment operation may cause degradation or damage to the filter 2 and is therefore undesirable. The line L1 herein includes a diverging point 80 along its path. As indicated by bold line in FIG. 5B, the diverging point 80 is connected to a line L2 (an example of "discharge line" or "second line" in particular in the claims) which is a line connected to the outside of the system and includes the on/off valve 25.

Figure 6:
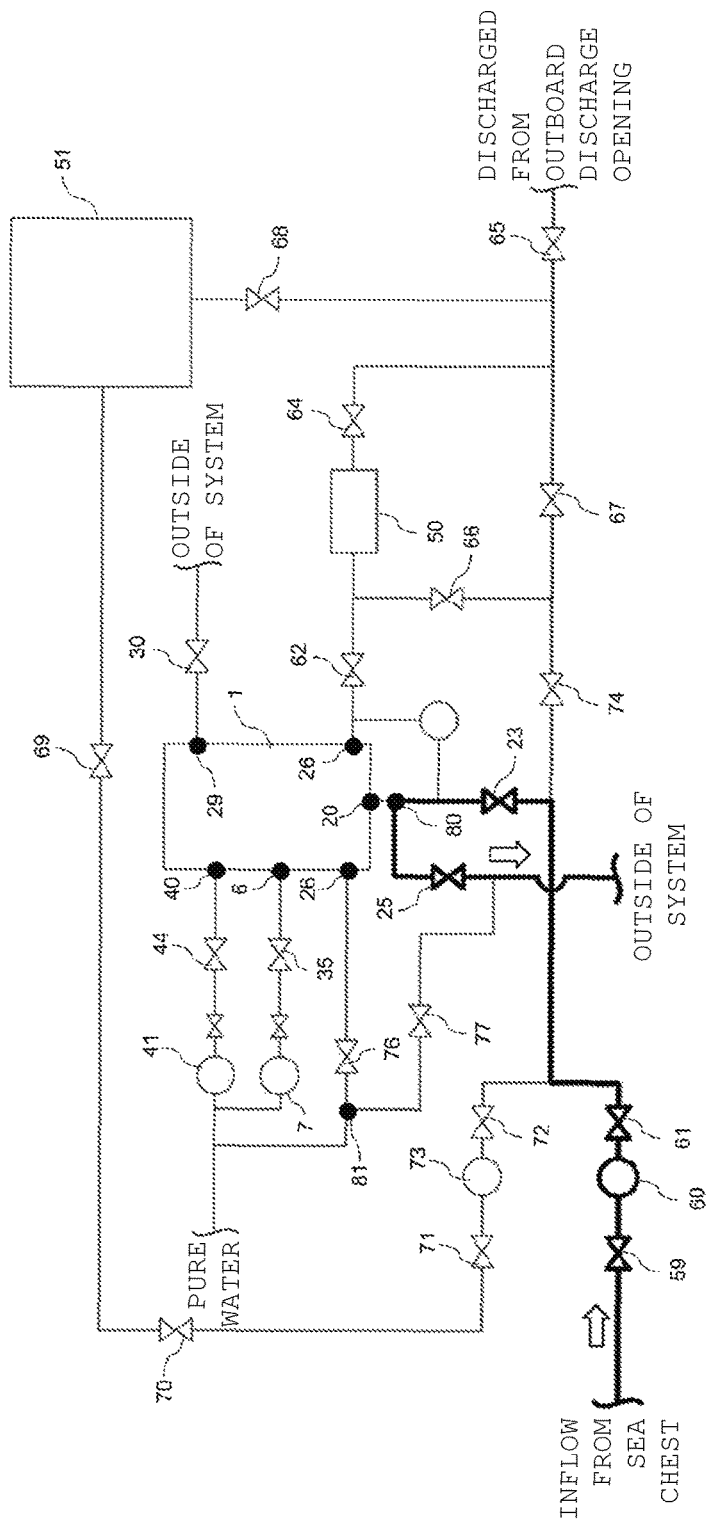
FIG. 6 is a diagram for describing flushing of line L1.
Figure 7:
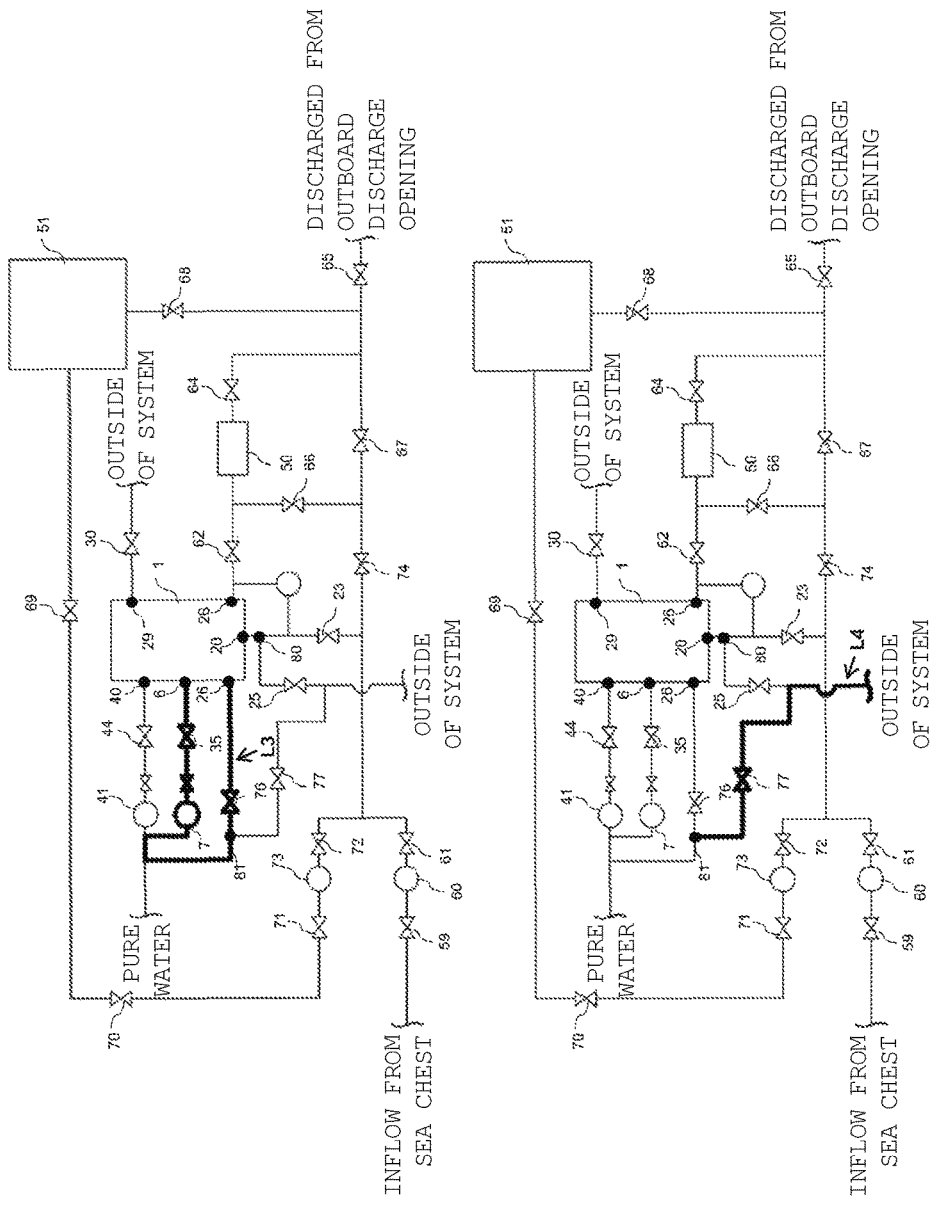
FIG. 7A and FIG. 7B are diagrams for respectively describing lines L3 and L4.

Then, the on/off valves 23, 25, 59, and 61 are opened, and the sea water and the like from outside the system is suctioned by the pump 60, whereby a flow of the ballast water W1 indicated by bold line in FIG. 6 is formed. As a result, the ballast water W4 that has remained in the line L1 can be discharged to the outside of the system via the line L2. In this way, the ballast water W4 can be prevented from being introduced into the primary side of the filter 2, whereby degradation or damage to the filter 2 can be suppressed.

3.2 Flushing of Line L3

A line L3 indicated by bold line in FIG. 7A (an example of "object line" or "third line" in particular in the claims) is a line through which the ballast water W2 flows from the outflow opening 26 on the secondary side of the filter 2 into the rinsing water jet nozzles 6 similarly on the secondary side of the filter 2. The line 3 is provided with on/off valves 35 and 77 and the rinsing water supply unit 7. That is, the line L3 is a line which is directly connected to the ballast water filtering device 1. In other words, the line L3 is a line associated with underwater rinsing for jetting the ballast water W2 as rinsing water from the rinsing water jet nozzles 6 toward the filter 2 so as to rinse the filter 2.

In the line L3 after the end of treatment operation, the ballast water W2 tends to readily remain as the ballast water W4. The jetting of the ballast water W4 onto the filter 2 for underwater rinsing during the next round of process operation may cause degradation or damage to the filter 2 and is undesirable. The line L3 herein includes a diverging point 81 along its path. As indicated by bold line in FIG. 7B, the diverging point 81 is connected to a line L4 (an example of "discharge line" or "fourth line" in particular in the claims) which is a line through which the ballast water flows to the outside of the system and which includes the on/off valves 25 and 77. While the line L4 indicated by the bold line in FIG. 7B is illustrated as being overlapped with a part of the line L2 indicated by the bold line in FIG. 5B, this is not a limitation and the line L4 only needs to flow outside the system.

Figure 8:
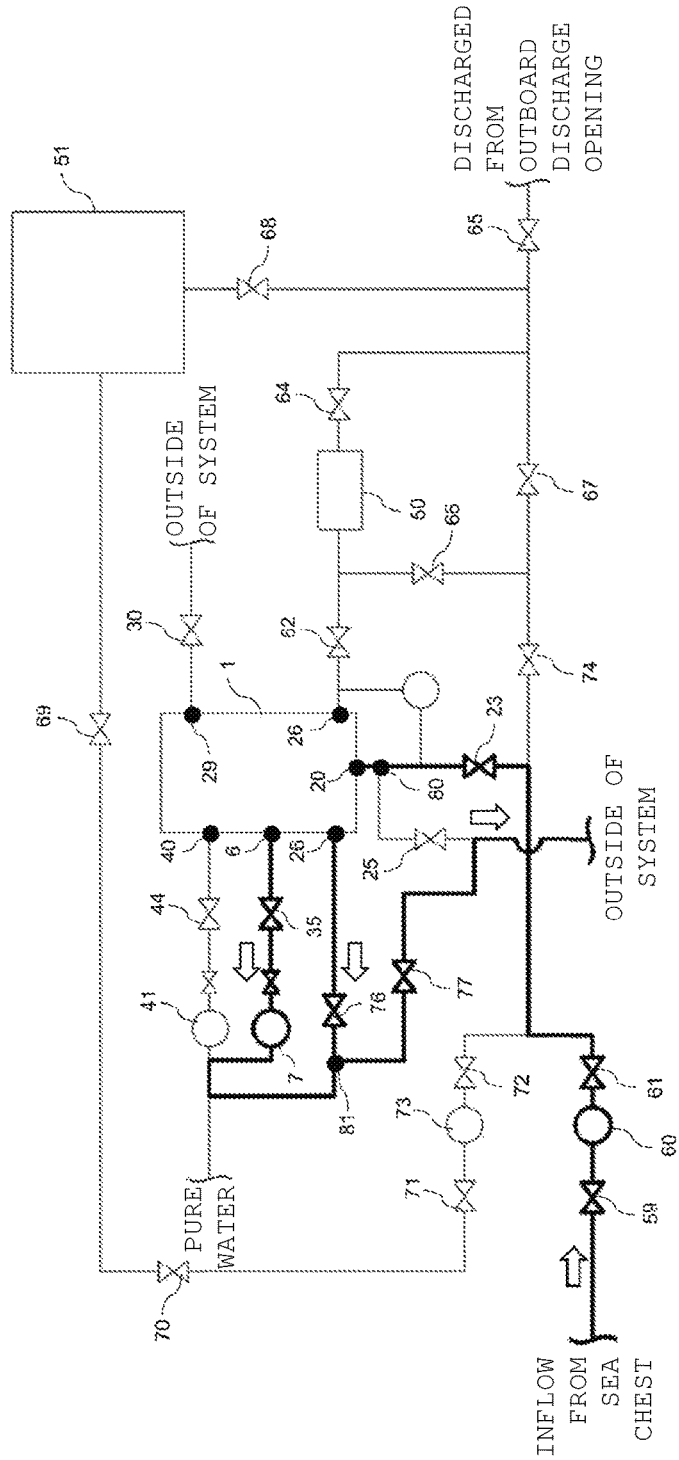
FIG. 8 is a diagram for describing flushing of line L3.

Then, the on/off valves 23, 59, and 61 associated with the ballast water W1 and the on/off valves 35, 76, and 77 associated with the ballast water W2 are opened, and the sea water and the like from outside the system is suctioned by the pump 60, whereby flows of the ballast water W1 and the ballast water W2 indicated by bold line in FIG. 8 are formed. Accordingly, the ballast water W4 that has remained in the line L3 can be discharged to the outside of the system via the line L4. In this way, the ballast water W4 can be prevented from being subjected to underwater rinsing by the filter 2, whereby degradation or damage to the filter 2 can be suppressed.

4. Preferable Treatment Procedure

An example of a preferable treatment procedure for the flushing will be described with reference to the following steps. The treatment procedure may be implemented by the control unit 9 (an example of "control unit" in the claims), or performed by an operator manually. Preferably, the start of the present step is immediately before or after starting the treatment operation by the ballast water treatment device. However, the step may be implemented at an arbitrary timing selected by the operator, or by using the elapse of a predetermined time after a treatment operation as a trigger.

Start (Step S3-1)

Figure 9:
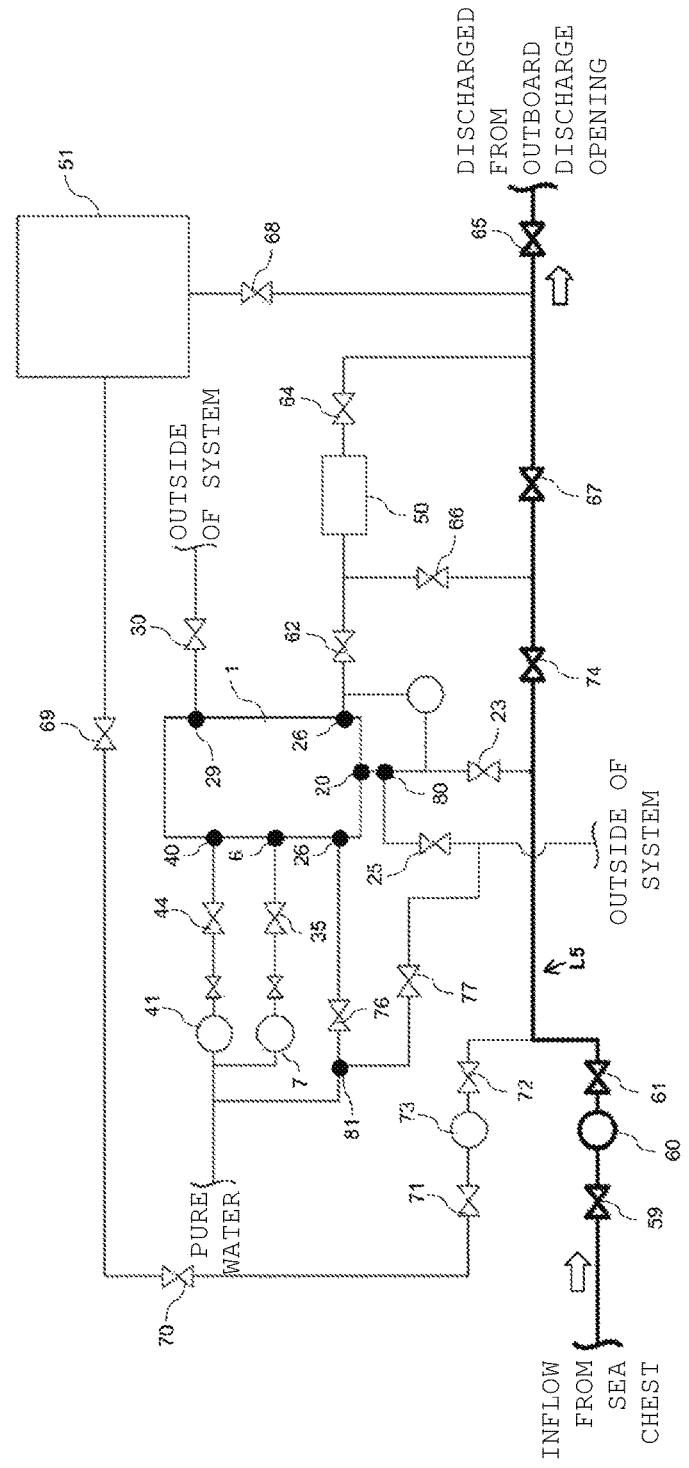
FIG. 9 is a diagram for describing flushing of bypass line L5.

Flushing is performed on the bypass line L5 indicated by bold line in FIG. 9. The on/off valves 59, 61, 65, 67, and 74 are opened, and the seawater and the like from outside the system is suctioned by the pump 60, whereby a flow of the ballast water W1 indicated by the bold line in FIG. 9 is formed. In this way, the ballast water W4 that has remained in the bypass line L5 is discharged to the outside of the system.

(Step S3-2)

Thereafter, the line L1 is flushed, the details of which are as described above with reference to FIG. 5A, FIG. 5B and FIG. 6. That is, at least one of the on/off valves 65, 67, and 74 is closed, the on/off valves 23, 25, 59, and 61 are opened, and the sea water and the like from outside the system is suctioned by the pump 60, whereby a flow of the ballast water W1 is formed as indicated by the bold line in FIG. 6. In this way, the ballast water W4 that has remained in the line L1 is discharged to the outside of the system via the line L2.

(Step S3-3)

Figure 10:
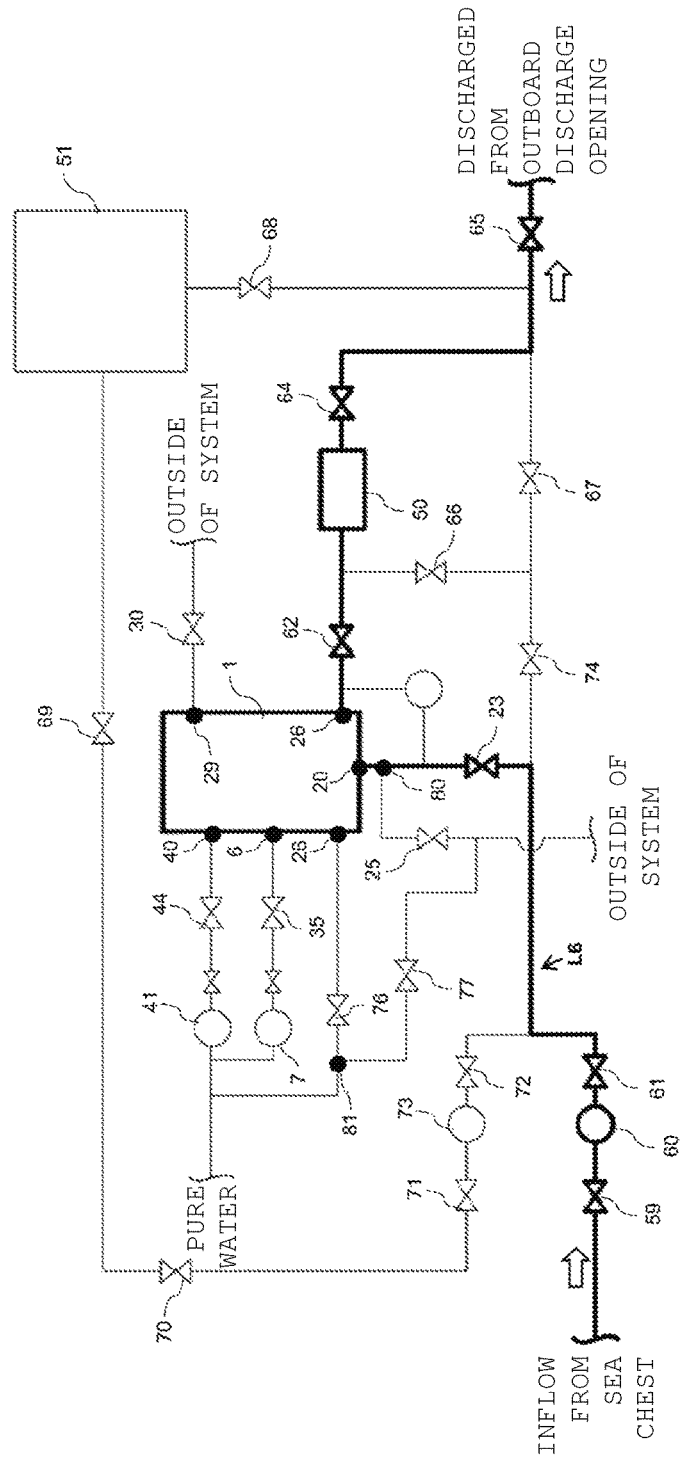
FIG. 10 is a diagram for describing flushing of line L6.

Flushing is performed with respect to the line L6 indicated by bold line in FIG. 10. The on/off valve 25 is closed and the on/off valves 62, 64, and 65 are opened, and the sea water and the like from outside the system is suctioned by the pump 60, whereby flows of the ballast water W1, W2, and W3 are formed, as indicated by the bold line in FIG. 10. In this way, the ballast water W4 that has remained in the line L6 is discharged to the outside of the system.

(Step S3-4)

Then, flushing of line L3 is performed, the details of which are as described above with reference to FIG. 7A, FIG. 7B and FIG. 8. That is, the on/off valve 62 is closed and the on/off valves 35, 76, and 77 are opened, and the sea water and the like from outside the system is suctioned by the pump 60. As a result, flows of the ballast water W1 and the ballast water W2 as indicated by the bold line in FIG. 8 are formed, whereby the ballast water W4 that has remained in the line L3 is discharged to the outside of the system via the line L4.

In other words, the line flushing method according to the present invention may be considered a ballast water flow method including a step in which the ballast water W4 that remains in a line in contact with the ballast water filtering device 1 is discharged to the outside of the system without passing through or coming into contact with the ballast water filtering device 1, and then new ballast water is caused to flow through the line.

4. Effects

The embodiment provides the following effects.

(i) The ballast water treatment device according to the present embodiment, by forming a flow of the ballast water W1 indicated by the bold line in FIG. 6, can discharge the ballast water W4 that has remained in the line L1 outside the system via the line L2. In this way, the ballast water W4 can be prevented from being introduced into the primary side of the filter 2, whereby degradation or damage to the filter 2 can be suppressed.

(ii) The ballast water treatment device according to the present embodiment, by forming flows of the ballast water W1 and the ballast water W2 as indicated by the bold line in FIG. 8, can discharge the ballast water W4 that has remained in the line L3 to the outside of the system via the line L4. In this way, the ballast water W4 can be prevented from being subjected to underwater rinsing by the filter 2, and degradation or damage to the filter 2 can be suppressed.

5. Modification

The ballast water treatment device according to the present invention may be implemented in the following modes.

First, while the ballast water treatment device according to the present embodiment includes the ultraviolet reactor 50 for sterilizing microorganisms included in the ballast water W2, the ballast water treatment device may be implemented with a chemical agent introduction unit for sterilizing microorganisms using a chemical agent, such as hypochlorous acid, in addition to or instead of the ultraviolet reactor 50. It should be noted that in this case, a neutralizer introduction unit for neutralizing the chemical agent needs to be provided during the de-ballast treatment.

Secondly, while the ballast water treatment device according to the present embodiment includes the ultraviolet reactor 50 for sterilizing microorganisms included in the ballast water W2, the ballast water treatment device may be implemented with an electrolytic device for producing chlorine by electrolysis of the ballast water to sterilize microorganisms using the oxidizing action of chlorine, in addition to or instead of the ultraviolet reactor 50.

Third, while the ballast water treatment device according to the present embodiment includes the ultraviolet reactor 50 for sterilizing microorganisms included in the ballast water W2, the ballast water treatment device may be implemented with an ozone generation device for generating ozone for sterilizing microorganisms with the oxidation action of ozone, in addition to or instead of the ultraviolet reactor 50.

Fourth, implementation of flushing according to the present invention is not limited to the ballast water filtering device 1 disclosed in the ballast water treatment device according to the present embodiment, and different configurations may be employed.

While a preferable embodiment of the present invention has been described, the present invention is not limited to the embodiment and may include various modes of implementation. In particular, the pumping unit is not limited to a pump. The upstream or downstream order of the on/off valves and the pumps may be partly changed within the equivalent scope of the invention, or new lines, on/off valves, pumps and the like may be added.

What is claimed is:

1. A system containing a ballast water treatment device, the ballast water treatment device comprising:
    a filtering device including a filter having a primary side and a secondary side for filtering ballast water during a filtering operation;
    a plurality of lines associated with predetermined valves and connected to a ballast pump for flowing the ballast water to and from the filtering device; and
    a control unit for controlling before or after the filtering operation the valves and the ballast pump so as to flush outside the system via one of predetermined discharge lines the ballast water remaining in at least one object line selected from a group consisting of
    a) a line L1 connected to the filtering device for inputting the ballast water to the primary side of the filter from a sea chest for inputting the ballast water,
    b) a line L3 located in the secondary side for jetting the ballast water towards the filter,
    c) a line L5 connecting the sea chest to one of the discharge lines, and
    d) a line L6 connecting the sea chest to the filtering device on the primary side of the filter and then to an output flow opening on the secondary side.

2. The system containing a ballast water treatment device according to claim 1, wherein the control unit flushes the ballast water remaining in the object line at a time.

3. The system containing a ballast water treatment device according to claim 1, wherein the control unit flushes the ballast water remaining in the object lines in a sequential manner.

4. The ballast water treatment device according to claim 1, wherein the control unit flushes the ballast water remaining in the object line being the line L5 first and then the line L1 in a sequential manner.

5. The ballast water treatment device according to claim 1, wherein the control unit flushes the ballast water remaining in the object line being the line L6 first and then the line L3 in a sequential manner.

6. The system containing the ballast water treatment device according to claim 1, wherein
the plurality of lines includes a bypass line into which the ballast water flows from outside the system and from which the ballast water is discharged to the outside of the system, and
the line L1 has one end connected to the bypass line and one point connected to a discharge line L2.

7. The system containing the ballast water treatment device according to claim 6, wherein
the filtering device further includes a rinsing water jet nozzle for jetting rinsing water for rinsing the filter, and
the line L3 has one point connected to a discharge line L4 and one end connected to the rinsing water jet nozzle.

8. The system containing the ballast water treatment device according to claim 1, wherein
the filtering device further includes a rinsing water jet nozzle for jetting rinsing water for rinsing the filter, and
the line L3 has one point connected to discharge line L4 and one end connected to the rinsing water jet nozzle.

9. A ballast water treatment device configured to be connected with a plurality of lines associated with predetermined valves for flowing ballast water to and from the ballast water treatment device, a ballast pump applying pressure in the lines so as to cause the ballast water to flow in the lines, the ballast water treatment device comprising:
a filtering device connected to the lines and including a filter having a primary side and a secondary side for filtering the ballast water during a filtering operation; and
a control unit for controlling before or after the filtering operation the valves and the ballast pump so as to flush via one of predetermined discharge lines the ballast water remaining in at least one object line selected from a group consisting of
a) a line L1 connected to the filtering device for inputting the ballast water to the primary side of the filter from a sea chest for inputting the ballast water,
b) a line L3 located in the secondary side for jetting the ballast water towards the filter,
c) a line L5 connecting the sea chest to one of the discharge lines, and
d) a line L6 connecting the sea chest to the filtering device on the primary side of the filter and then to an output flow opening on the secondary side.

10. The ballast water treatment device according to claim 9, wherein the control unit flushes the ballast water remaining in the object line at a time.

11. The ballast water treatment device according to claim 10, wherein
the plurality of lines includes a bypass line into which the ballast water flows from outside the system and from which the ballast water is discharged to the outside of the system,
the line L1 has a first diverging point and one end connected to the bypass line while the other end connected to a primary side of the filter, and
the discharge line is line L2 connected to the first diverging point and configured to discharge the ballast water that has remained in the line L1.

12. The ballast water treatment device according to claim 11, wherein
the filtering device further includes a rinsing water jet nozzle for jetting rinsing water for rinsing the filter,
the line L3 has a second diverging point and one end connected to a secondary side of the filter while the other end connected to the rinsing water jet nozzle, and
the discharge line is line L4 connected to the second diverging point and configured to discharge the ballast water that has remained in the line L3.

13. The ballast water treatment device according to claim 10, wherein
the filtering device further includes a rinsing water jet nozzle for jetting rinsing water for rinsing the filter,
the line L3 has a second diverging point and one end connected to a secondary side of the filter and while the other end connected to the rinsing water jet nozzle, and
the discharge line is line L4 connected to the second diverging point and configured to discharge the ballast water that has remained in the line L3.

14. The ballast water treatment device according to claim 9, wherein the control unit flushes the ballast water remaining in the object lines in a sequential manner.

* * * * *